(12) United States Patent
Kobayashi

(10) Patent No.: US 12,240,403 B2
(45) Date of Patent: Mar. 4, 2025

(54) AIRBAG ATTACHMENT STRUCTURE

(71) Applicant: Marelli Corporation, Saitama (JP)

(72) Inventor: Yousuke Kobayashi, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 18/281,069

(22) PCT Filed: Dec. 6, 2022

(86) PCT No.: PCT/JP2022/044966
§ 371 (c)(1),
(2) Date: Sep. 8, 2023

(87) PCT Pub. No.: WO2023/171060
PCT Pub. Date: Sep. 14, 2023

(65) Prior Publication Data
US 2025/0026300 A1 Jan. 23, 2025

(30) Foreign Application Priority Data
Mar. 9, 2022 (JP) .................. 2022-036645

(51) Int. Cl.
*B60R 21/2165* (2011.01)
*B60R 21/205* (2011.01)
*B60R 21/215* (2011.01)

(52) U.S. Cl.
CPC ........ *B60R 21/2165* (2013.01); *B60R 21/205* (2013.01); *B60R 2021/21537* (2013.01)

(58) Field of Classification Search
CPC .............. B60R 21/2165; B60R 21/205; B60R 2021/21537; B60R 21/215
See application file for complete search history.

(56) References Cited

U.S. PATENT DOCUMENTS 6,378,894 B1 4/2002 Trevino et al.
8,424,905 B2 4/2013 Brunet
(Continued)

FOREIGN PATENT DOCUMENTS

| JP | 2004-231027 A | 8/2004 |
|---|---|---|
| JP | 2010-159035 A | 7/2010 |
| JP | 2018-167820 A | 11/2018 |

OTHER PUBLICATIONS

U.S. Pat. No. 9,156,428 B2, A.
(Continued)

Primary Examiner — Jason D Shanske
Assistant Examiner — Matthew James O'Neill
(74) Attorney, Agent, or Firm — Young Basile Hanlon & MacFarlane, P.C.

(57) ABSTRACT

An airbag attachment structure includes a door portion and an opening, and further includes an attachment portion, a hinge portion, and a flap. The door portion is provided with a through hole which penetrates from an inner side to an outer side of the door portion at an inclination of an acute angle from a hinge portion side to an one end portion side of the door portion, the flap has, at a tip portion thereof, a projection portion inserted into the through hole, and in the flap, in a state where the projection portion is inserted into the through hole, a gap is formed between a back surface of an instrument panel and the projection portion, and a gap is formed between a position, which is the tip portion of the flap and at which the projection portion is not formed, and the inner side of the door portion.

8 Claims, 12 Drawing Sheets

(56) References Cited

U.S. PATENT DOCUMENTS 9,156,428 B2    10/2015  Edeline
2014/0203540 A1  7/2014  Edeline

OTHER PUBLICATIONS

US 2014/203540 A1, A.
JP 2018-167820 A, A.
JP 2010-159035 A, A.
U.S. Pat. No. 8,424,905 B2, A.
JP 2004-231027 A, A.
U.S. Pat. No. 6,378,894 B1, A.

AIRBAG ATTACHMENT STRUCTURE

CROSS REFERENCE TO RELATED APPLICATIONS

This application is a national phase 371 of International Patent Application Serial No. PCT/JP2022/044966, filed Dec. 6, 2022, which claims priority to Japanese Patent Application Serial No. 2022-036645, filed on Mar. 9, 2022, the contents of which are hereby incorporated by reference.

TECHNICAL FIELD

The present invention relates to an airbag attachment structure.

BACKGROUND ART

U.S. Pat. No. 9,156,428B2 discloses a vehicle safety device that includes a door portion connected to a support frame via a hinge, and a deflector (a flap) provided between the door portion and an airbag and configured to protect the hinge during deployment of the airbag. In the vehicle safety device, when an inflator of the airbag operates, a cleavage line formed on an instrument panel is cleaved due to a pressure generated due to inflation of the airbag in a space below the door portion, and the door portion rotates outward around the hinge. Accordingly, the airbag is expanded toward an occupant.

SUMMARY OF INVENTION

In the vehicle safety device according to U.S. Pat. No. 9,156,428B2, a position of the flap is determined by engaging ribs provided at end portions of the flap with grooves provided at a back side of the door portion. In such a structure, the ribs may be engaged with the grooves in a state where the flap is formed to be larger than a design dimension due to, for example, an error during manufacturing. In such a case, a force may be applied in a direction that the flap pushes up the door portion, and an outline of the cleavage line may rise up on a surface of the instrument panel outside the door portion.

The invention is made in view of the above problems, and an object of the invention is to provide an airbag attachment structure in which generation of a force that a flap pushes up a door portion is prevented, and a cleavage line does not rise up on a surface of an instrument panel.

According to an aspect of the present invention, an airbag attachment structure for attaching an airbag to an instrument panel includes, a door portion whose at least one end portion is welded to a back surface of the instrument panel along a cleavage line of the instrument panel, and the door portion being opened when the airbag is deployed, an attachment portion to which an airbag case for storing the airbag is attached, and which has an opening at which the door portion is opened and brought into an opened state when the airbag is deployed, a hinge portion connected to the attachment portion and configured to turnably hold the door portion and a flap interposed between the airbag and the hinge portion and configured to turn together with the door portion when being biased by the airbag during deployment of the airbag, the door portion is provided with a through hole penetrating from an inner side to an outer side of the door portion at an inclination of an acute angle from a hinge portion side to a one end portion side of the door portion, the flap has, at a tip portion thereof, a projection portion inserted into the through hole, and in the flap, in a state where the projection portion is inserted into the through hole, a gap is formed between the back surface of the instrument panel and the projection portion, and a gap is formed between a position, which is the tip portion of the flap and at which the projection portion is not formed, and the inner side of the door portion.

According to the above aspect, the projection portion is provided at the tip of the flap, the projection portion is inserted into the through hole penetrating at an inclination of an acute angle, a gap is formed between the projection portion and the instrument panel, and a gap is formed between the door portion and a position on the flap other than the projection portion. According to such a configuration, the projection portion of the flap can be freely moved with respect to the through hole in the door portion in an inclination direction of an acute angle, and even in a case where the flap is formed to be larger than a design dimension due to an error during manufacturing or the like, a force that presses the door portion outward is not generated. Therefore, the door portion is not pressed by the flap, and the cleavage line is prevented from rising up on the instrument panel.

DESCRIPTION OF EMBODIMENTS

Hereinafter, an airbag attachment structure 10 according to an embodiment of the invention will be described with reference to the accompanying drawings.

Figure 1:
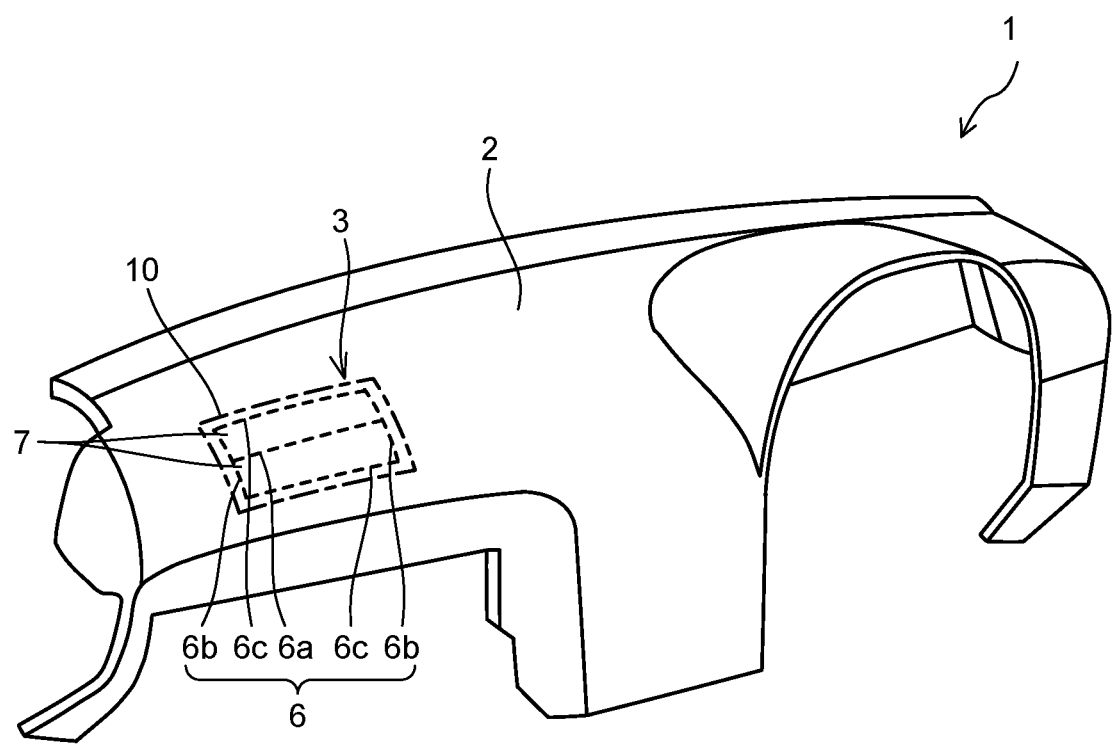
FIG. 1 is a perspective view of an instrument panel to which an airbag attachment structure according to an embodiment of the invention is applied.
Figure 2:
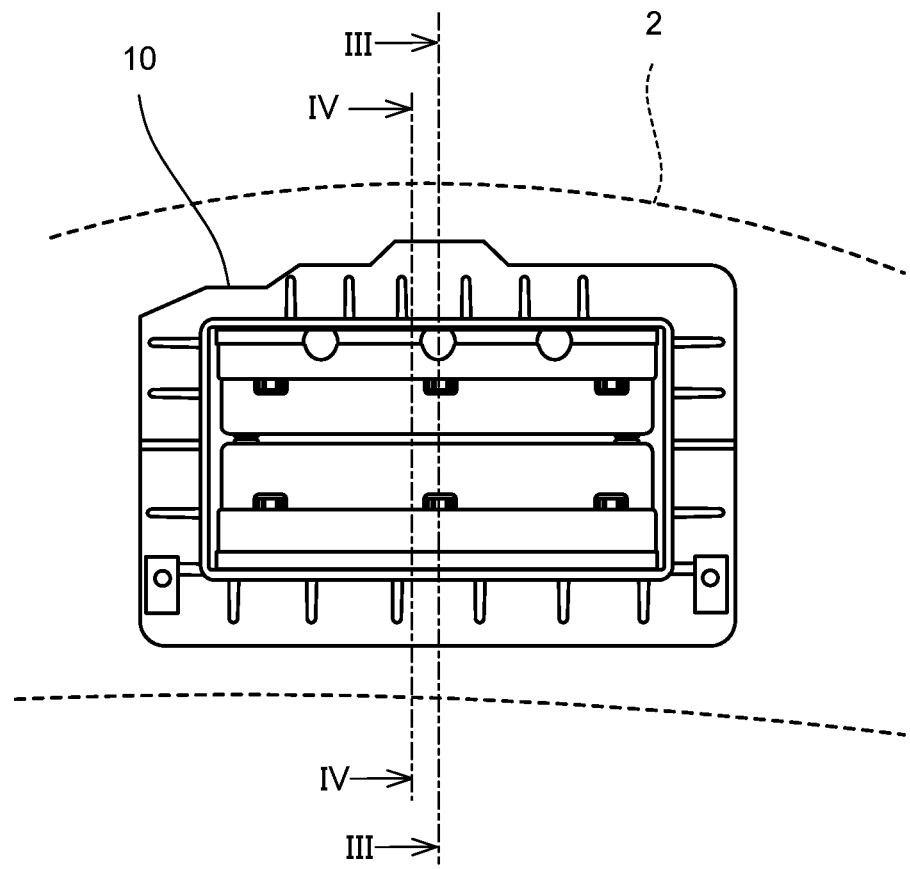
FIG. 2 is a view of the airbag attachment structure as viewed from a back surface of the instrument panel.
Figure 3:
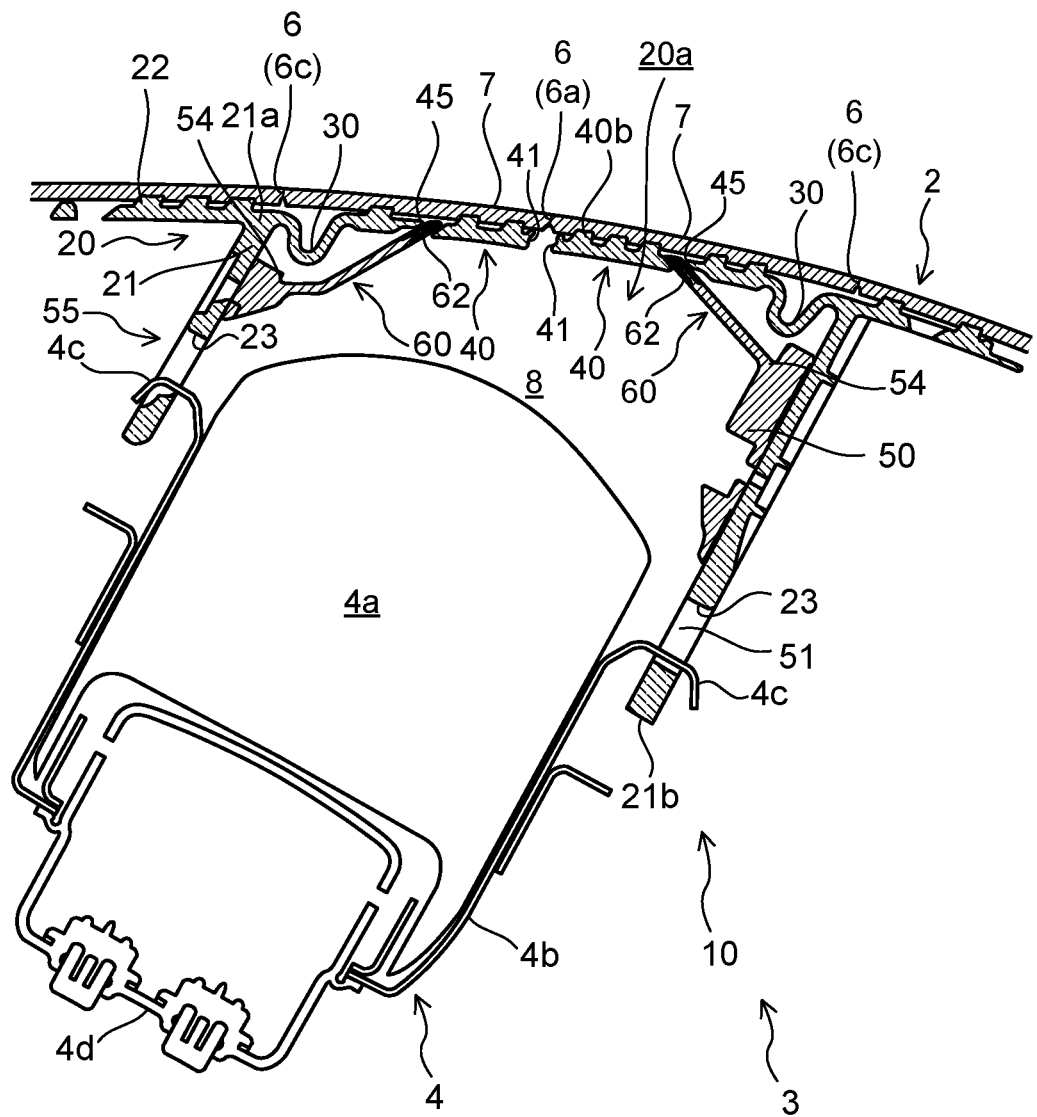
FIG. 3 is a view corresponding to a cross section taken along a line III-III in FIG. 2, and is a cross-sectional view illustrating the airbag attachment structure.

First, an instrument panel 2 of a vehicle 1 such as an automobile to which the airbag attachment structure 10 is applied will be described with reference to FIGS. 1, 2 and 3. FIG. 1 is a perspective view of the instrument panel 2. FIG. 2 is a view of the airbag attachment structure 10 in FIG. 1 as viewed from a back surface of the instrument panel 2. FIG. 3 is a view corresponding to a cross section taken along a line III-III in FIG. 2, and is a cross-sectional view illustrating the airbag attachment structure 10.

As illustrated in FIG. 1, the instrument panel 2 is provided at a front part of a vehicle cabin of the vehicle 1. The vehicle 1 includes an airbag device 3.

The airbag device 3 is a safety device for protecting an occupant in an emergency such as a collision of the vehicle 1. The airbag device 3 is provided at a part of the instrument panel 2 on a front passenger seat side, and protects an occupant sitting on a front passenger seat. The airbag device 3 includes an airbag module 4 (see FIG. 3) and the airbag attachment structure 10.

Examples of the airbag device 3 include an airbag for a driver seat, an airbag for a front passenger seat, a side airbag, and a curtain airbag. In the present embodiment, the airbag device 3 is an airbag for a front passenger seat.

As illustrated in FIG. 3, the airbag module 4 includes an airbag 4a, an airbag case 4b, a plurality of hooks 4c, and an inflator 4d.

The airbag 4a is formed in a bag shape, and is folded and stored in the airbag case 4b. The airbag 4a is deployed and inflated in an emergency. The plurality of hooks 4c fix the airbag case 4b to the instrument panel 2. The inflator 4d generates gas for deploying and inflating the airbag 4a.

As illustrated in FIG. 1, the airbag attachment structure 10 is provided at a back surface of the instrument panel 2 on the front passenger seat side. Examples of the airbag attachment structure 10 include an integral type airbag attachment structure integrally provided with the instrument panel 2, a separate type airbag attachment structure separately provided from the instrument panel 2 and attached to the instrument panel 2. In the present embodiment, the airbag attachment structure 10 is an integral type airbag attachment structure and constitutes a part of the instrument panel 2.

The instrument panel 2 normally covers the airbag module 4 from a front surface. The instrument panel 2 has a cleavage line 6 on the back surface thereof. In an emergency, the instrument panel 2 is cleaved from the cleavage line 6 due to a pressing force generated due to the deployed and inflated airbag 4a, and an opening for the airbag 4a to expand into the vehicle cabin is formed.

The cleavage line 6 is formed in a recessed shape from the back surface of the instrument panel 2 and has a groove shape that does not reach the front surface of the instrument panel 2. The cleavage line 6 is provided into a substantially H shape and includes a lateral cleavage line portion 6a extending substantially in a vehicle width direction, and left and right vertical cleavage line portions 6b extending substantially in a vehicle longitudinal direction from both end portions of the lateral cleavage line portion 6a. In the present embodiment, the cleavage line 6 further includes a pair of lateral cleavage line portions 6c each connecting corresponding end portions of the vertical cleavage line portions 6b. In the instrument panel 2, a pair of opening and closing portions 7 by which the opening can be formed are defined by the cleavage line 6. The lateral cleavage line portion 6a is located at a position to be first cleaved in the substantially H-shaped cleavage line 6. The cleavage line 6 is formed only on a back surface side of the instrument panel 2, and cannot be observed from a front surface of the instrument panel 2.

Figure 4:
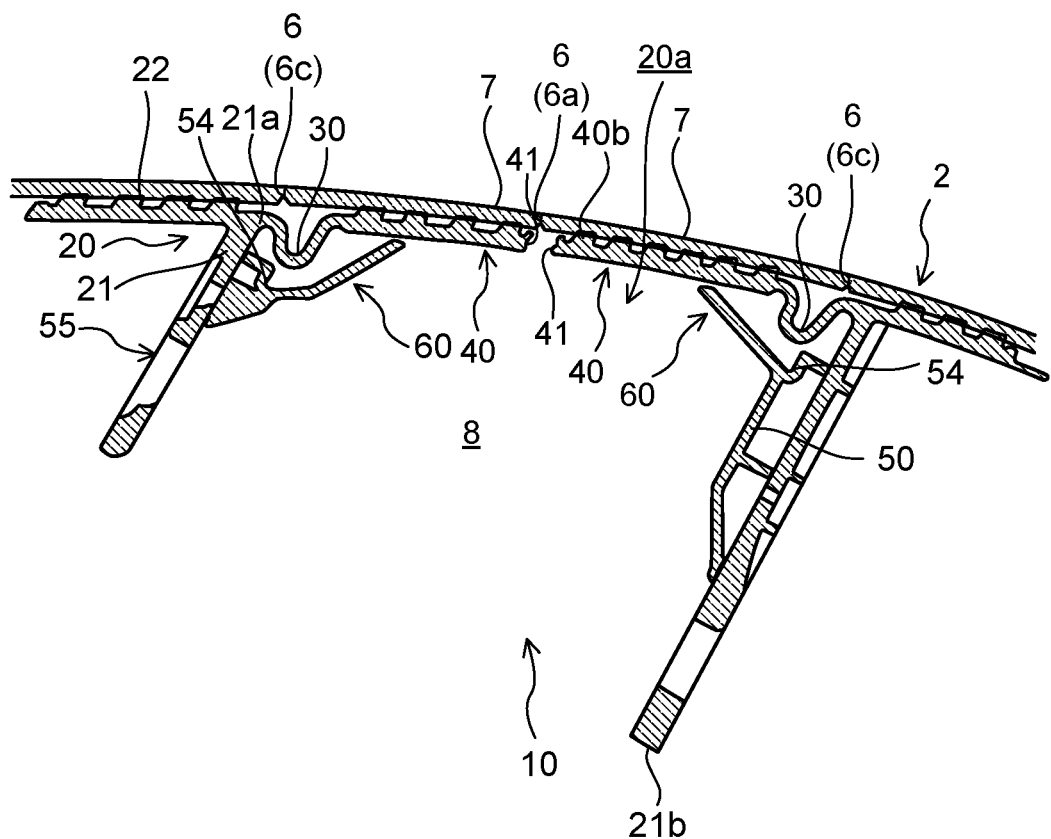
FIG. 4 is a view corresponding to a cross section taken along a line IV-IV in FIG. 2, and is a cross-sectional view illustrating the airbag attachment structure.
Figure 5:
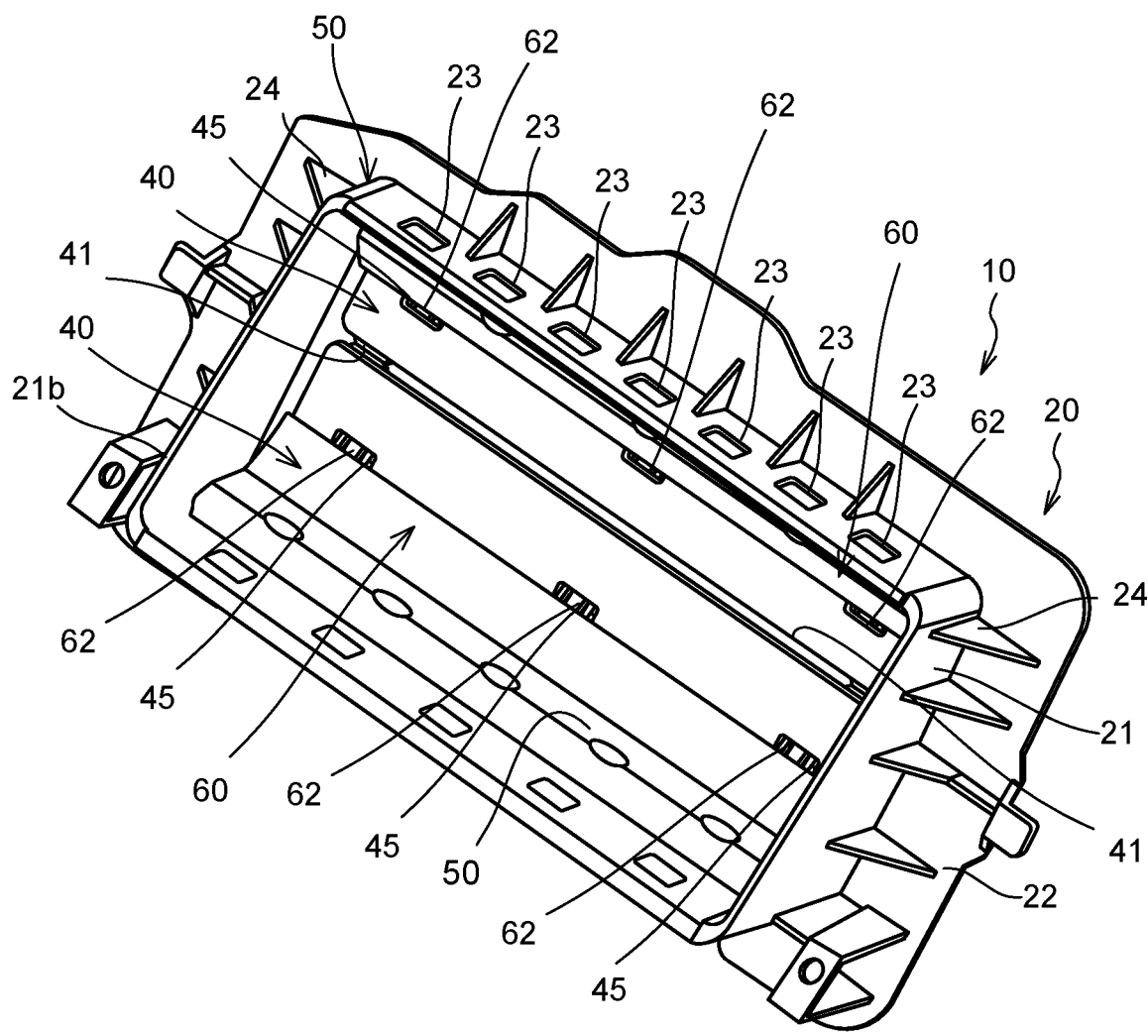
FIG. 5 is a perspective view illustrating the airbag attachment structure as viewed from a back surface thereof.
Figure 6:
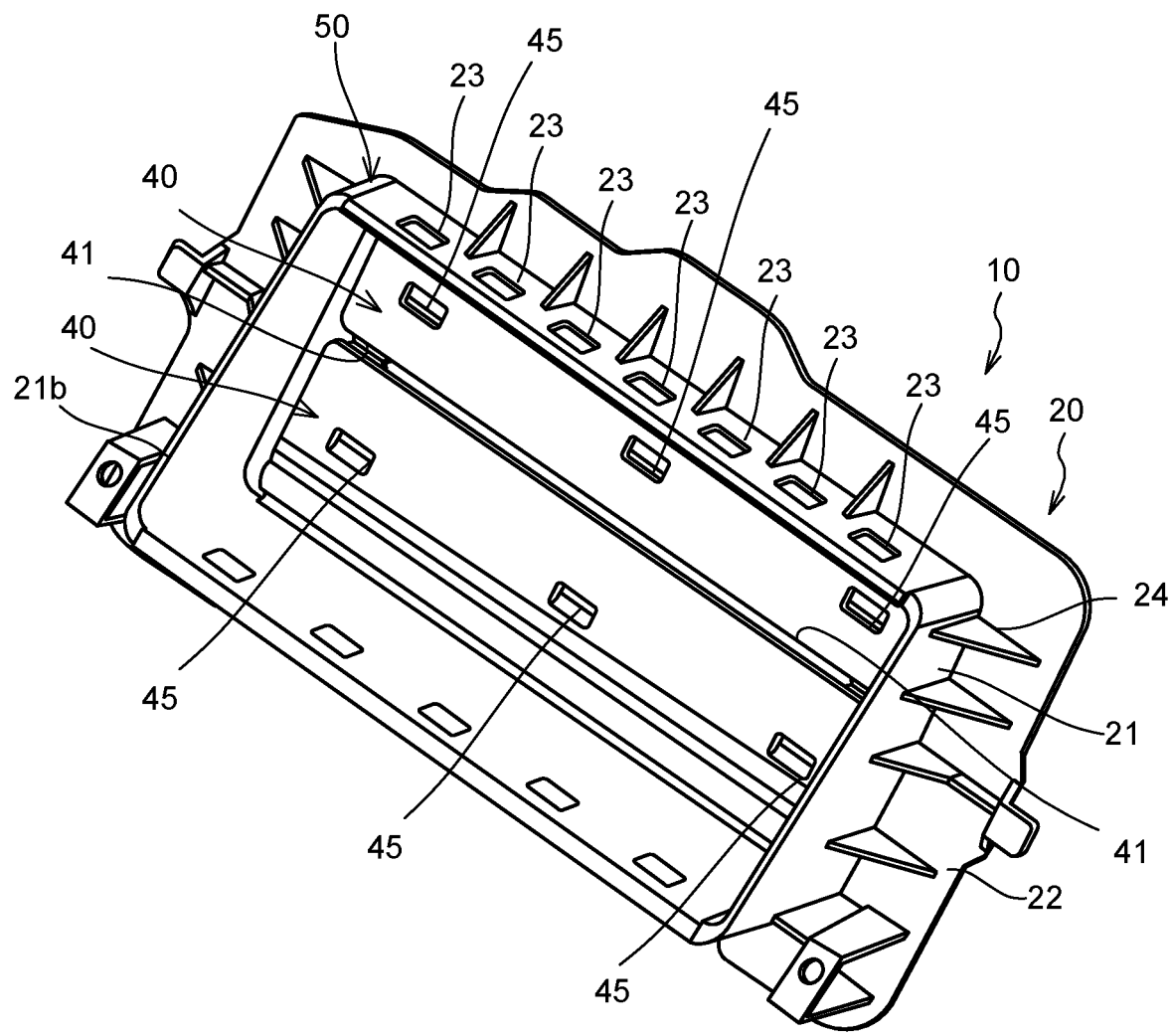
FIG. 6 is a perspective view illustrating a state where guide portions and flaps are removed from the airbag attachment structure in FIG. 5.

Next, the airbag attachment structure 10 will be described with reference to FIGS. 4 to 6. FIG. 4 is an enlarged view of a vicinity of the instrument panel 2 in a cross section taken along a line IV-IV in FIG. 2. FIG. 5 is a perspective view illustrating the airbag attachment structure 10 as viewed from a back surface. FIG. 6 is a perspective view illustrating a state where a guide portion 50 and flaps 60 are removed from the airbag attachment structure 10 in FIG. 5.

As illustrated in FIG. 3, the airbag attachment structure 10 is a structure for attaching the airbag 4a to the instrument panel 2. The airbag attachment structure 10 includes an attachment portion 20, a pair of hinge portions 30, a pair of door portions 40, the guide portion 50, and the flaps 60.

The attachment portion 20 is molded using a resin material. The attachment portion 20 has an opening 20a at which the door portions 40 are opened and brought into an opened state when the airbag 4a is deployed. The airbag case 4b for storing the airbag 4a is attached to the attachment portion 20 via the hooks 4c. The attachment portion 20 includes a main body 21, a flange portion 22, attachment holes 23, and a plurality of reinforcing ribs 24 (see FIGS. 5 and 6).

As illustrated in FIGS. 5 and 6, the main body 21 is formed in a substantially rectangular tubular shape. As illustrated in FIG. 3, the opening 20a is formed at one end portion 21a of the main body 21. The airbag module 4 is attached to the other end portion 21b of the main body 21.

The flange portion 22 is formed at an outer periphery of the one end portion 21a of the main body 21 over the whole outer periphery. As illustrated in FIG. 3, the flange portion 22 is attached to abut against the back surface of the instrument panel 2. The flange portion 22 is welded to the back surface of the instrument panel 2 to reinforce the instrument panel 2.

The attachment holes 23 penetrate the main body 21 in a thickness direction thereof. The hooks 4c of the airbag module 4 are engaged with the attachment holes 23 in a manner of protruding from an inner side toward an outer side of the main body 21. Accordingly, the airbag module 4 is attached to the attachment portion 20.

As illustrated in FIGS. 5 and 6, the plurality of reinforcing ribs 24 are arranged to an outer periphery of the flange portion 22 at intervals from each other. The reinforcing ribs 24 connect and reinforce the main body 21 and the flange portion 22.

As illustrated in FIG. 3, the pair of hinge portions 30 are provided to turnably hold the respective door portions 40. The hinge portions 30 are integrally molded with the door portions 40 and the attachment portion 20. Each of the hinge portions 30 is formed to protrude to an inner side of the opening 20a so as to have a substantially U-shaped cross section. When the airbag 4a is deployed and the door portions 40 are opened, each of the hinge portions 30 rotates with a connection point with the attachment portion 20 as a starting point while a part having the substantially U-shaped cross section is extending from the opening 20a to the outside.

Hereinafter, a space surrounded by the door portions 40, the airbag 4a, and the attachment portion 20 is referred to as a "deployment passage 8".

The airbag 4a provided in the deployment passage 8 is inclinedly attached to the attachment portion 20 such that a distance to one of the hinge portions 30 is larger than a distance to the other of the hinge portions 30. That is, the airbag 4a is attached to the attachment portion 20 in a state where a deploying direction is not perpendicular to the door portions 40 but is inclined with respect to the door portions 40.

The door portions 40 are integrally molded with the attachment portion 20 and the hinge portions 30. One end portion 41 of each of the door portions 40 is provided along the lateral cleavage line portion 6a of the instrument panel 2. That is, each of the door portions 40 is provided such that at least the one end portion 41 is along the cleavage line 6 of the instrument panel 2. Each of the door portions 40 is provided such that side end portions at both ends of the one end portion 41 are along the vertical cleavage line portions 6b of the instrument panel 2. The door portions 40 are attached to abut against the back surface of the instrument panel 2. More specifically, a plurality of vibration welding ribs 40b standing outward are formed on an outer side of each of the door portions 40, and tip portions of the vibration welding ribs 40b and the back surface of the instrument panel 2 are bonded by vibration welding.

The pair of door portions 40 are provided such that the one end portions 41, which are free ends of the pair of door portions 40, face each other on an inner side of the lateral cleavage line portion 6a. When the airbag 4a is deployed, each of the door portions 40 is opened such that the one end portion 41 turns around the corresponding hinge portion 30. In each of the door portions 40, a plurality of through holes 45 into which projection portions 62 formed at a tip of each of the flaps 60 are engaged are formed.

As illustrated in FIG. 6, three through holes 45 are formed along an axial direction of a rotating shaft in each of the hinge portions 30 (also referred to as an extending direction in which each of the hinge portions 30 extend, and is a width direction of the vehicle 1 in a state where the airbag attachment structure 10 is attached in front of the front passenger seat of the vehicle 1). As illustrated in FIG. 3, in a state where the airbag 4a is stored, that is, in a state before the airbag 4a is deployed, the projection portions 62 formed at tip portions 61 of the flaps 60 are inserted into the through holes 45.

The guide portion 50 is provided to protrude from the main body 21 of the attachment portion 20 to the deployment passage 8. The guide portion 50 guides the deployment of the airbag 4a while reducing a volume of the deployment passage 8. The guide portion 50 is molded using a resin material.

The guide portion 50 is formed to have higher rigidity than the flaps 60. Here, the rigidity is the difficulty of deformation (magnitude of a deformation amount) when the airbag 4a is deployed and is inflated and a pressure in the deployment passage 8 increases. That is, when the airbag 4a comes into contact with the guide portion 50 and the flaps 60 in a state where an internal pressure of the airbag 4a is increased in the deployment passage 8, the guide portion 50 is less likely to be deformed as compared with the flaps 60 (the deformation amount is small). More specifically, the guide portion 50 includes reinforcing ribs 56 on a back surface that does not face the deployment passage 8 (see FIG. 7). Accordingly, the guide portion 50 is configured to have higher rigidity than the flap 60.

The flap 60 is connected to the guide portion 50 at a connection point 54 and extends toward a corresponding one of the door portions 40. The flap 60 linearly extends from the connection point 54 of the guide portion 50 to the deployment passage 8, and is interposed between the airbag 4a and the corresponding hinge portion 30. At the tip portion 61 of the flap 60 on a door portion 40 side, three projection portions 62 (see FIG. 7) extend linearly along the extending direction of the flap 60.

The flaps 60 are biased and bent by the airbag 4a when the airbag 4a is deployed, and turn together with the door portions 40 around the connection points 54 during deployment of the airbag 4a. Since the flaps 60 are provided between the airbag 4a and the hinge portions 30, the pressure generated due to the inflation of the airbag 4a can be concentrated between the pair of door portions 40 (the lateral cleavage line portion 6a) when the airbag 4a is deployed, and the damage to the hinge portions 30 can be prevented by preventing the airbag 4a from coming into direct contact with the rotating shafts of the hinge portions 30.

The flap 60 is integrally molded with the guide portion 50. Instead, the guide portion 50 and the flap 60 may be separately formed and assembled. In this case, by molding the guide portion 50 and the flap 60 using different materials or to have different thicknesses, the rigidity of the guide portion 50 can be made higher than that of the flap 60.

Next, a connection structure of the door portion 40 and the flap 60 will be described with reference to FIGS. 7 and 8.

Figure 7:
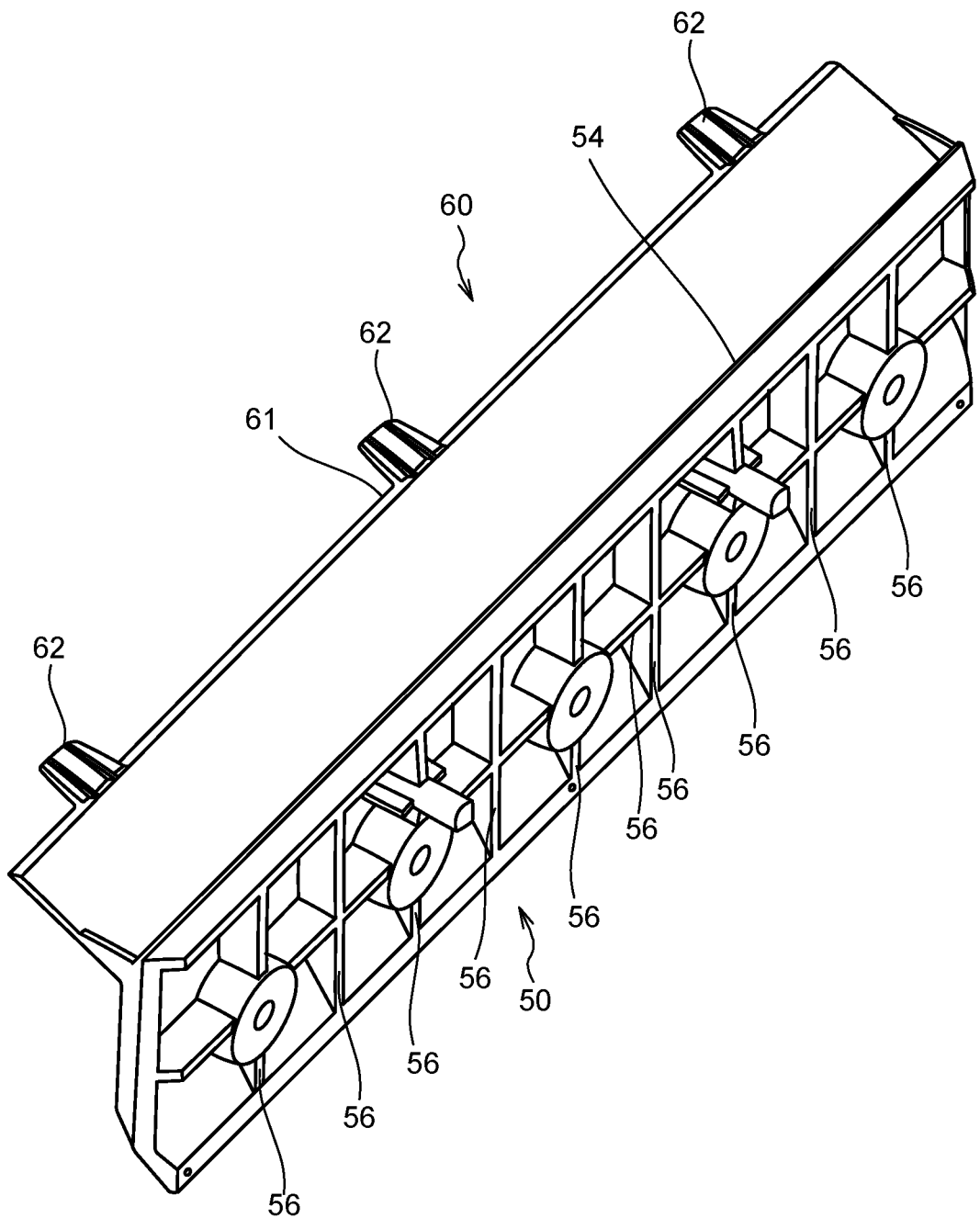
FIG. 7 is a perspective view of the guide portion and the flap as viewed from a front surface.
Figure 8:
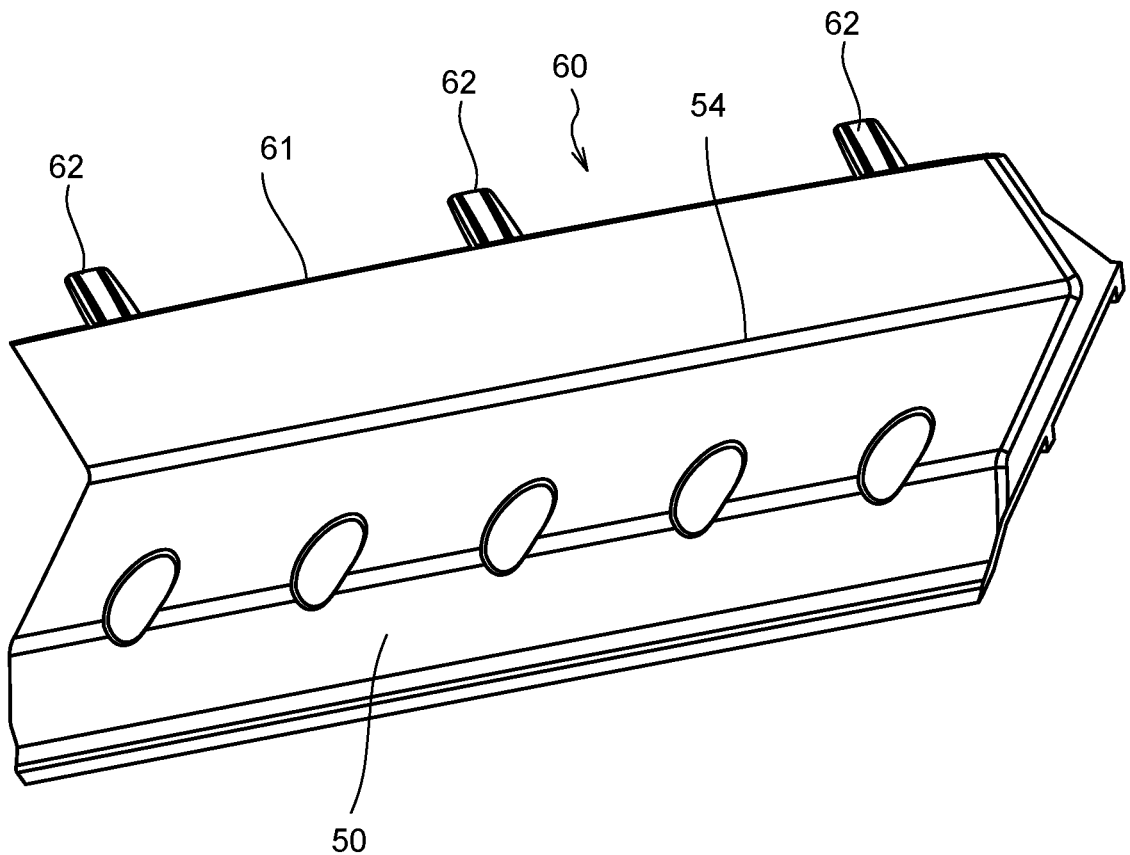
FIG. 8 is a perspective view of the guide portion and the flap as viewed from a back surface.

FIG. 7 is a perspective view of the guide portion 50 and the flap 60 as viewed from a side being in contact with the main body 21. FIG. 8 is a perspective view of the guide portion 50 and the flap 60 as viewed from a deployment passage 8 side.

As illustrated in FIG. 7, the flap 60 that linearly extends in a flat plate shape from the connection point 54 is provided on the guide portion 50. At the tip portion 61 of the flap 60, three projection portions 62 are formed to further protrude from the tip portion 61 in an extending direction of the flap 60. Further, the guide portion 50 includes the lattice-shaped reinforcing ribs 56 on the back surface thereof that does not face the deployment passage 8.

As illustrated in FIG. 3, in each of the door portions 40, the through holes 45 each penetrating from an inner side to an outer side of the door portion 40 at an inclination from a hinge portion 30 side to a one end portion 41 side of the door portion 40 are formed. An inclination direction of the through holes 45 is set to be substantially the same as the extending direction of the projection portions 62 of the flap 60 extending from the guide portion 50 in a state where the guide portion 50 is attached to the main body 21. That is, the through holes 45 are formed to be inclined at an acute angle of 90 degrees or less with respect to the back surface of the corresponding door portion 40.

With such a configuration, in the state where the guide portion 50 is fixed to the main body 21, the projection portions 62 protruding from the tip portion 61 of the flap 60 are respectively inserted into the through holes 45 formed in the door portion 40.

Here, each of the projection portions 62 is disposed such that a tip thereof (an end portion on a side separated farthest from the tip portion 61) is located at a position that does not reach a front surface side of the through hole 45 formed to penetrate the door portion 40, that is, a position that does not come into contact with the back surface of the instrument panel 2. In addition, as illustrated in FIG. 4, the tip portion 61 of the flap 60 other than the three projection portions 62 is not in contact with the back surface of the door portion 40. That is, a gap is formed between the tip of the projection portion 62 and the back surface of the instrument panel 2, and a gap is formed between the tip portion 61 of the flap 60 other than the projection portions 62 and the back surface of the door portion 40.

Therefore, at the tip portion 61 of the flap 60, only the projection portions 62 are in contact with the through holes 45 of the door portion 40, and other portions of the tip portion 61 are not in contact with the door portion 40.

According to such a configuration, the flap 60 is held by the door portion 40 such that the projection portions 62 are respectively inserted into the through holes 45 in the extending direction of the flap 60.

Here, in the related art, as a method for fixing the flaps 60 to the door portions 40, the ribs provided on the tip portions 61 of the flaps 60 are engaged with grooves provided on the back side of the door portions 40, and thus positions of the flaps 60 are determined. In such a structure, the ribs may be engaged with the grooves in a state where the flaps 60 are formed to be larger than a design dimension due to, for example, an error during manufacturing. In such a case, a force is applied in a direction that the flaps 60 push up the door portions 40, and the door portions 40 push up the instrument panel 2 fixed on an outer side of the door portions 40, and thus an outline of the cleavage line 6 may rise up on the front surface of the instrument panel 2.

Meanwhile, in each of the flaps 60 according to the invention, the projection portions 62 protruding from the tip portion 61 are respectively inserted into the through holes 45 in the extending direction of the flap 60 and are freely movable with respect to the door portion 40 in an inserting direction. Accordingly, even if a positional relation between the flap 60 and the door portion 40 changes, the flap 60 is freely movable with respect to the door portion 40 in the extending direction of the flap 60, so that it is possible to prevent the force from acting in the direction where the door portions 40 are pushed up. Further, since the door portions 40 and the back surface of the instrument panel 2 are fixed via the vibration welding ribs 40b, it is possible to largely secure the gap between the back surface of the instrument panel 2 and the projection portions 62 by an amount corresponding to a height of the vibration welding ribs 40b, and it is possible to prevent the tips of the projection portions 62 from interfering with the back surface of the instrument panel 2.

Next, a configuration of each of the projection portions 62 of the flap 60 will be described with reference to FIGS. 9 to 11.

Figure 9:
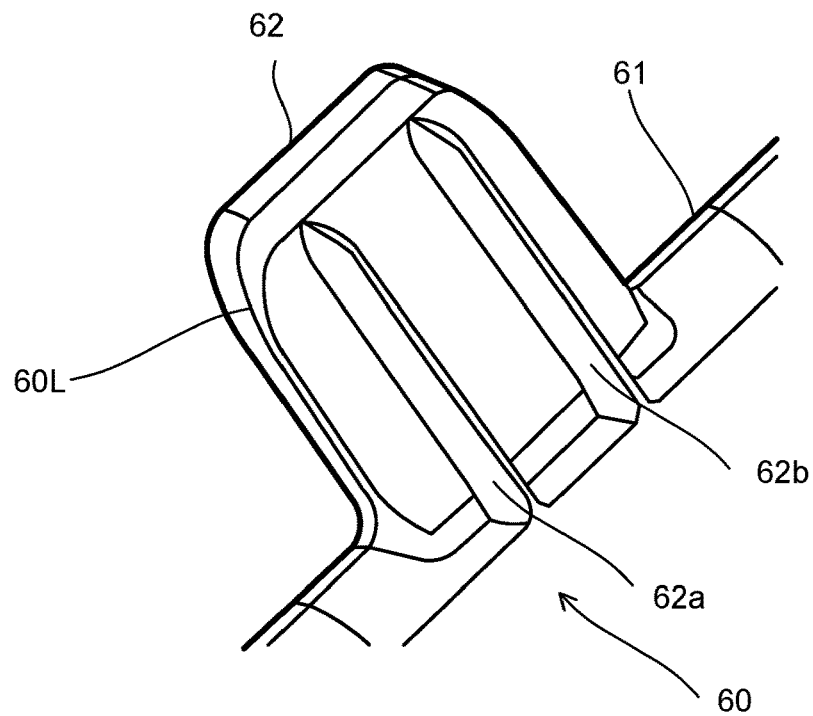
FIG. 9 is an enlarged view of a front surface of a projection portion.
Figure 10:
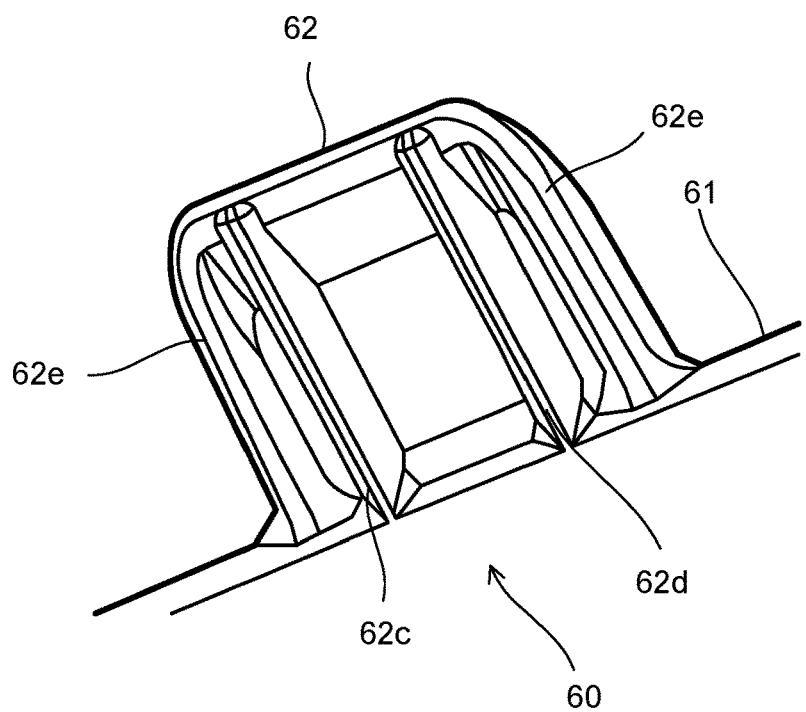
FIG. 10 is an enlarged view of a back surface of the projection portion.

FIG. 9 is an enlarged view of a front surface of the projection portion 62 (a surface of the flap 60 opposite to the deployment passage 8), and FIG. 10 is an enlarged view of a back surface of the projection portion 62 (a surface of the flap 60 on the deployment passage 8 side, that is, a surface facing the airbag 4a). FIG. 11 is a cross-sectional view of the door portion 40 in a state where the projection portion 62 is fitted into the through hole 45.

As illustrated in FIGS. 9 and 10, the projection portion 62 protrudes in a rectangular shape from the tip portion 61 of the flap 60. The projection portion 62 has, on a front surface and a back surface thereof, ribs enlarged in a thickness direction thereof. Two ribs 62a and 62b are formed on the front surface of the projection portion 62, and two ribs 62c and 62d are formed on the back surface of the projection portion 62. Further, in addition to the two ribs 62c and 62d serving as a first rib, a rib 62e serving as a second rib, which is enlarged in the thickness direction toward a back surface side, is formed at an outer periphery portion on the back surface of the projection portion 62.

The projection portion 62 is enlarged in the thickness direction thereof due to the ribs 62a and 62b on the front surface and the ribs 62c, 62d, and 62e on the back surface. The ribs 62a and 62b on the front surface and the ribs 62c and 62d on the back surface of the projection portion 62 are in contact with an inner side of the through hole 45 near a center of the through hole 45 in a width direction thereof, and the rib 62e is in contact with the inner side of the through hole 45 near end portions of the through hole 45 in the width direction thereof. Since the projection portion 62 includes these ribs, the projection portion 62 is more closely fitted in the through hole 45 of the door portion 40 in the width direction (in the width direction from the back surface to the front surface of the door portion 40). According to such a configuration, it is possible to eliminate a backlash between the projection portion 62 and the through hole 45, and it is possible to prevent generation of abnormal noise that is generated by the projection portion 62 and the through hole 45, even when the vehicle 1 travels and vibrates. A height of these ribs in the thickness direction is formed to such a height that the projection portion 62 is easily removed from the through hole 45 of the door portion 40 when the airbag 4a is deployed and the door portion 40 is opened as described later.

Instead of forming the ribs on the projection portion 62, ribs standing toward the projection portion 62 may be formed on the inner side of the through hole 45, and the ribs may be in contact with the projection portion 62, or ribs may be formed in both of the projection portion 62 and the through hole 45 so as to come into contact with each other.

Figure 11:
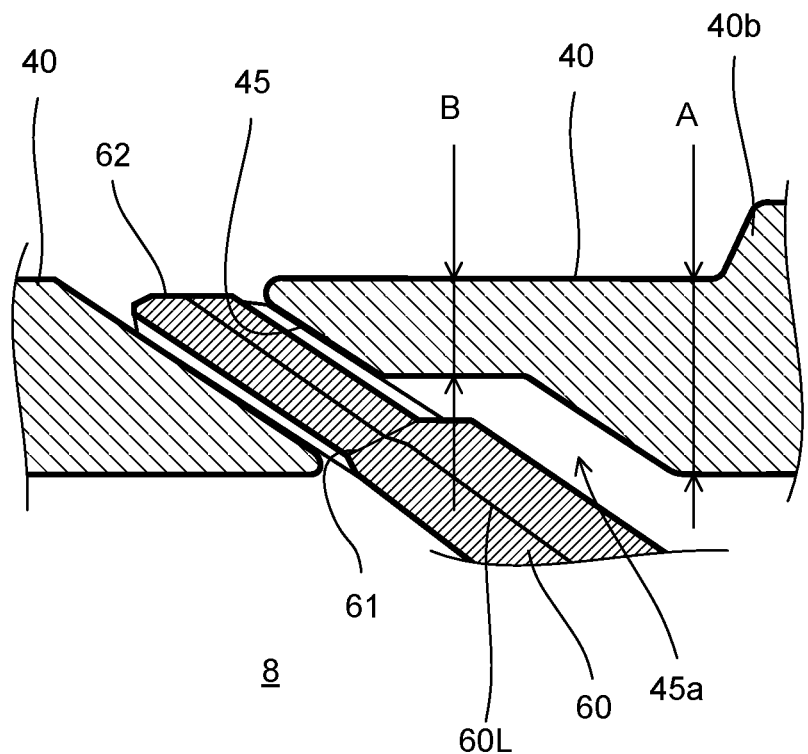
FIG. 11 is a cross-sectional view of the door portion in a state where the projection portion is fitted into a through hole.

Further, as illustrated in FIG. 11, the through hole 45 of the door portion 40 includes, on a side facing a back surface side (a deployment passage 8 side) thereof, a thin portion 45a formed to have a thin thickness shape in the thickness direction of the door portion 40. A thickness B of the thin portion 45a is smaller than a thickness A of other portions of the door portion 40. Due to the thin portion 45a, an opening area of the through hole 45 decreases stepwise from the inner side to the outer side of the door portion 40. Due to such a shape in which the opening area of the through hole 45 increases on the inner side of the door portion 40, when the projection portion 62 of the flap 60 is inserted into the through hole 45 of the door portion 40, the insertion is facilitated and operability is enhanced. Further, when the airbag 4a is deployed and the door portion 40 is opened, the projection portion 62 can be easily removed from the through hole 45 of the door portion 40.

The flap 60 and the guide portion 50 are formed using a resin material by injection molding. For the formation, a parting line 60L is formed on the flap 60. As illustrated in FIG. 9, the parting line 60L is formed at one position in the thickness direction of the flap 60 in a direction surrounding the flap 60. At the parting line 60L, the resin material may protrude outward, that is, a so-called burr may be formed.

Here, when the airbag 4a is deployed and the projection portions 62 of the flaps 60 are removed from the through holes 45 of the door portions 40, the airbag 4a comes into contact with the flaps 60 and the back surface side of the projection portions 62. At this time, when the burr is formed at each of the parting lines 60L of the projection portions 62 of the flaps 60, the parting lines 60L may come into contact with the airbag 4a.

Here, as illustrated in FIG. 9, in the projection portion 62 according to the present embodiment, the parting line 60L is formed on the back surface of the flap 60, that is, a side surface close to a surface side opposite to the surface facing the airbag 4a (a side close to the instrument panel 2). According to such a configuration, the airbag 4a is prevented from coming into direct contact with the parting lines 60L during deployment of the airbag 4a.

Figure 12:
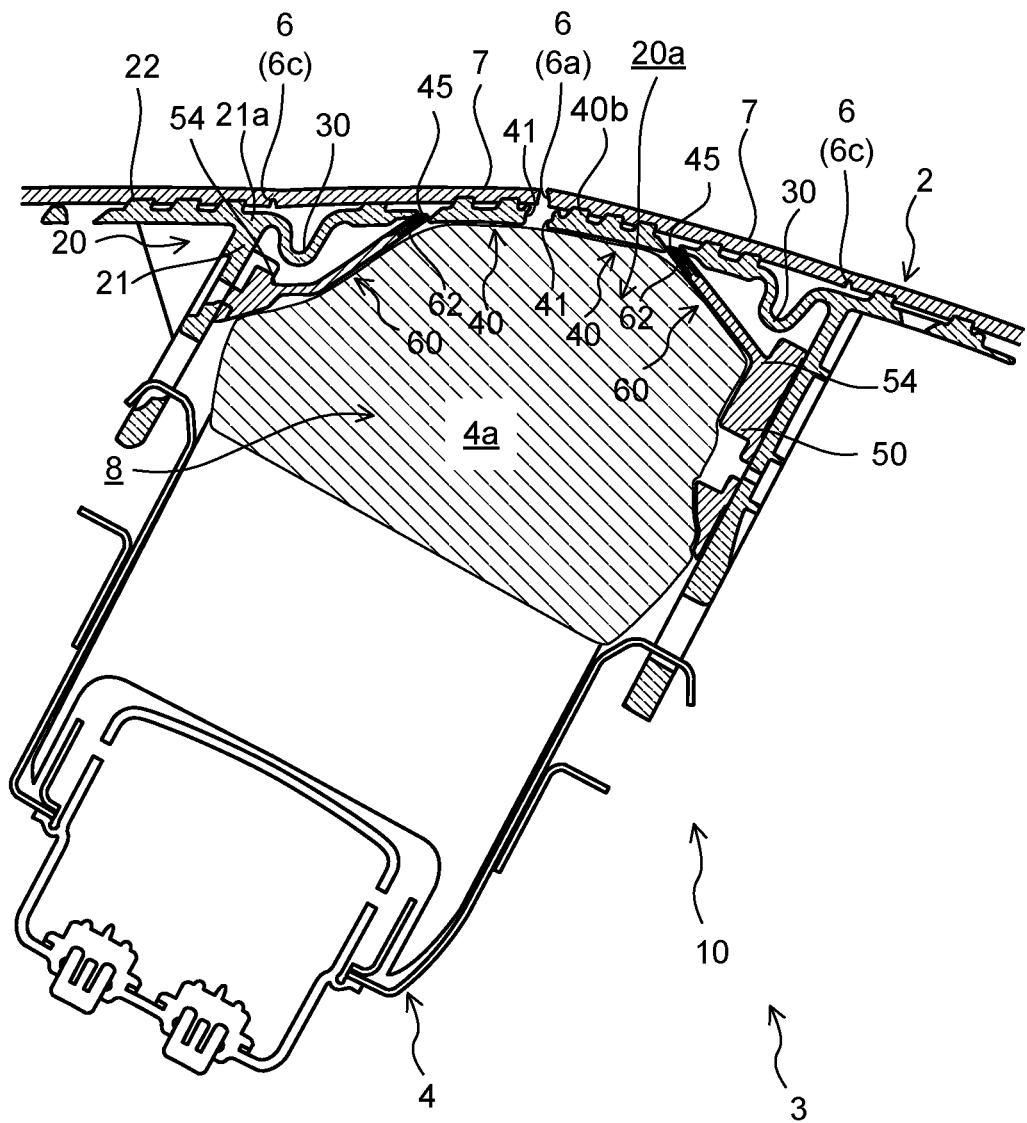
FIG. 12 is a cross-sectional view illustrating the airbag in a state during deployment.
Figure 13:
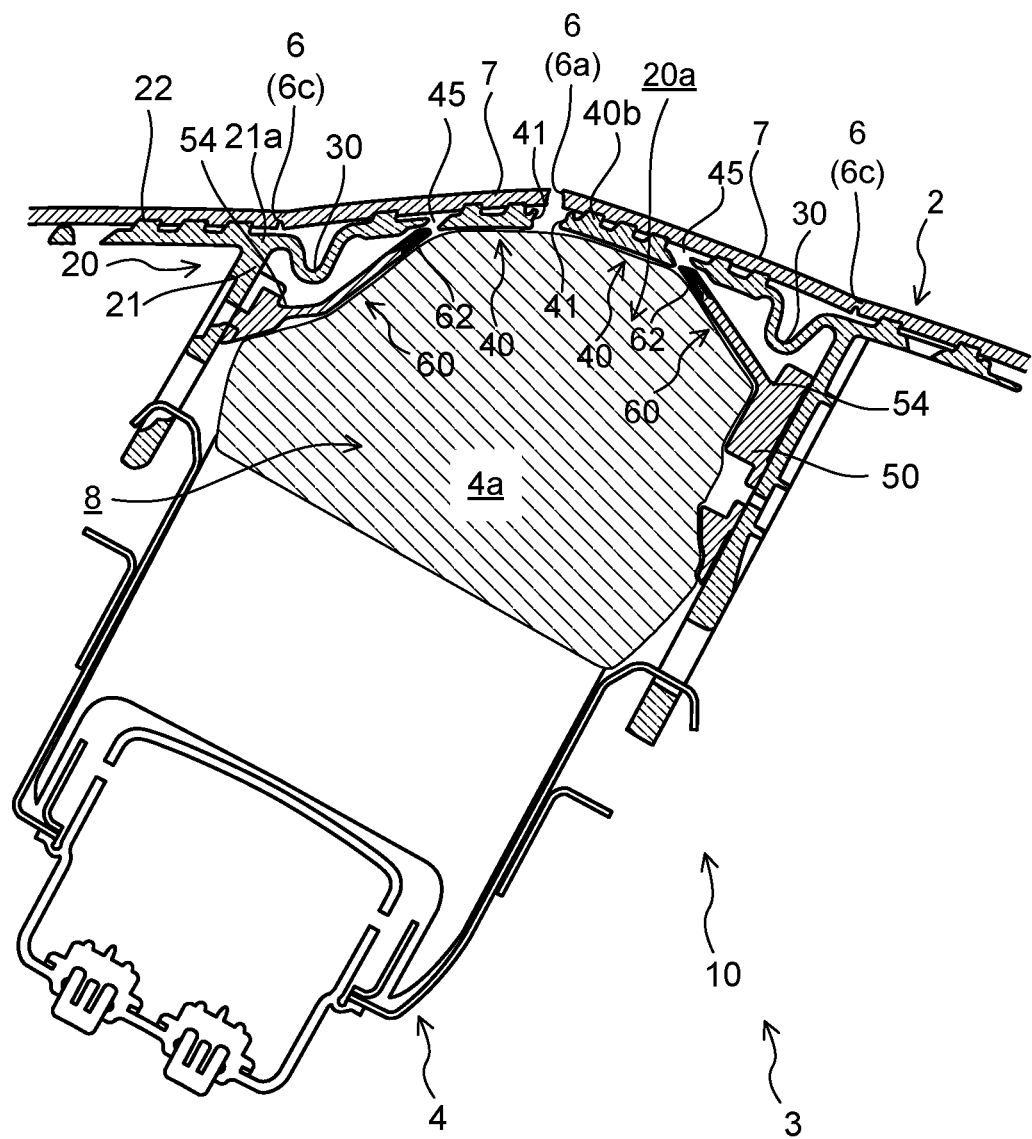
FIG. 13 is a cross-sectional view illustrating the airbag in a state during deployment.

Next, the door portions 40 and the flaps 60 during deployment of the airbag 4a will be described. FIG. 12 is a cross-sectional view illustrating the airbag 4a in a state during deployment. FIG. 13 is also a cross-sectional view illustrating the airbag 4a in a state during deployment.

In an emergency such as a collision of the vehicle 1, in response to a signal from a sensor (not shown) that detects the collision, the airbag device 3 operates to protect the occupant sitting on the front passenger seat. When the airbag device 3 operates, the airbag 4a is deployed and inflated by the gas generated by the inflator 4d so as to press the back surface of the instrument panel 2.

Here, a case (comparative example) where no guide portion is provided and only the flaps are attached to the attachment portion will be discussed. In this case, the flaps are disposed in the deployment passage defined by an upper surface of the airbag and the main body of the attachment portion. When the airbag is deployed and inflated, the flaps are bent, and the pressure cannot be accordingly concentrated on a cleavage line portion between the door portions. In particular, when the flaps are attached to the attachment portion, the flaps are bent to rotate respectively with contact positions with the attachment portion, which serve as base portions of the flaps, as starting points, and thus a bending amount increases.

In the airbag attachment structure 10 according to the present embodiment, the guide portion 50 having higher rigidity than the flap 60 is provided to protrude from the attachment portion 20 so as to narrow the deployment passage 8, and the flap 60 is connected to the guide portion 50. Accordingly, since the guide portion 50 having higher rigidity reduces a volume of the deployment passage 8, when the airbag 4a is inflated, the pressure can be concentrated between the door portions 40 (the lateral cleavage line portion 6a). Further, since the flap 60 is connected to the guide portion 50 protruding from the attachment portion 20, the flap 60 can be reduced in size. Therefore, the bending of the flap 60 is reduced by an amount corresponding to the reduction in size of the flap 60, so that the pressure when the airbag 4a is inflated is easily concentrated between the door portions 40.

When the airbag 4a is inflated and the pressure in the deployment passage 8 increases, as illustrated in FIG. 12, the airbag 4a presses the back surfaces of the door portions 40, and the door portions 40 move in a direction in which the door portions 40 turn around the respective hinge portions 30. Accordingly, the instrument panel 2 is cleaved from the cleavage line 6, and the opening and closing portions 7 are opened.

At this time, since the projection portions 62 are respectively inserted into the through holes 45 of the door portion 40 in a turning direction of the turning door portion 40, as illustrated in FIG. 13, the projection portions 62 are easily removed from the through holes 45 as the door portion 40 turns.

According to the embodiment described above, the following effects are achieved.

The airbag attachment structure 10 for attaching the airbag 4a to the instrument panel 2 includes: the door portions 40 in each of which at least the one end portion 41 is welded to the back surface of the instrument panel 2 along the cleavage line 6 of the instrument panel 2, and each of which is opened when the airbag 4a is deployed; the attachment portion 20 to which the airbag case 4b for storing the airbag 4a is attached and which has the opening 20a at which the door portions 40 are opened and brought into an opened state when the airbag 4a is deployed; the hinge portions 30 connected to the attachment portion 20 and configured to turnably hold the respective door portions 40; and the flaps 60 interposed between the airbag 4a and the hinge portions 30, and configured to turn together with the respective door portions 40 when being biased by the airbag 4a during deployment of the airbag 4a. In each of the door portions 40, the through holes 45 each penetrating from an inner side to an outer side of the door portion 40 at an inclination of an acute angle from the hinge portion 30 side to the one end portion 41 side of the door portion 40 are formed. Each of the flaps 60 has, at the tip portion 61 thereof, the projection portions 62 inserted into the respective through hole 45, and in the flap 60, in a state where the projection portions 62 are inserted into the through holes 45, a gap is formed between the back surface of the instrument panel 2 and the projection portion 62, and a gap is formed between a position, which is the tip portion 61 of the flap 60 and at which no projection portion 62 is formed, and the inner side of the door portion 40.

According to this configuration, the projection portions 62 are provided at the tip portion 61 of the flap 60, the projection portions 62 are inserted into the through holes 45 each penetrating at an inclination of an acute angle, a gap is formed between the projection portion 62 and the instrument panel 2, and a gap is formed between the tip portion 61 of the flap 60 other than the projection portions 62, and the door portion 40. According to such a configuration, the projection portion 62 of the flap 60 can be freely moved with respect to the through hole 45 in the door portion 40 in an inclination direction of an acute angle, and even in a case where the flap 60 is formed to be larger than a design dimension due to an error during manufacturing or the like, a force that presses the door portion 40 outward is not generated. Therefore, the door portions 40 are not pressed by the flaps 60, and the cleavage line 6 is prevented from rising up on the instrument panel 2.

Further, when the airbag 4a is deployed and the cleavage line 6 is cleaved by the door portions 40, the projection portions 62 are removed from the respective through holes 45.

In this configuration, during deployment of the airbag 4a, the projection portions 62 are removed from the through holes 45, and the flaps 60 can cause the pressure generated due to the inflation of the airbag 4a to be concentrated between the pair of door portions 40. Further, the flaps 60 can prevent the airbag 4a from coming into direct contact with rotating shafts of the hinge portions 30.

Further, at least one of the projection portion 62 and the through hole 45 is provided with ribs (62a to 62e) that are in contact with the other of the projection portion 62 and the through hole 45 in the thickness direction of the projection portion 62.

In this configuration, the ribs of each of the projection portions 62 are in contact with the corresponding through hole 45, so that a gap between the projection portion 62 and the through hole 45 can be reduced to eliminate backlash, and generation of abnormal noise that is generated by the projection portions 62 and the through holes 45 can be prevented even when the vehicle 1 travels and vibrates.

Further, the ribs include a first rib (62c, 62d) that is formed on the projection portion 62 and that is in contact with the inner side of the through hole 45, and a second rib (62e) that is provided at an end portion of the through hole 45 in the width direction thereof with respect to the first rib and that is in contact with the through hole 45.

In this configuration, the first rib is in contact with the inner side of the through hole 45 near the center of the through hole 45 in the width direction, and the second rib is in contact with the through hole 45 near the end portion, so that the projection portion 62 is more reliably fixed to the through hole 45. Therefore, the gap between the projection portion 62 and the through hole 45 can be reduced to eliminate the backlash, and the generation of the abnormal noise that is generated by the projection portions 62 and the through holes 45 can be prevented even when the vehicle 1 travels and vibrates.

Further, during deployment of the airbag 4a, each of the flaps 60 swings around the corresponding connection point 54, and the flap 60 is linearly formed from the connection point 54 to the tip of the projection portion 62.

In this configuration, when the airbag 4a is deployed, the airbag 4a comes into contact with the linear flaps 60 along surfaces, and causes the flaps 60 to turn around the respective connection points 54, so that the flaps 60 can cause the pressure generated due to the inflation of the airbag 4a to be concentrated between the pair of door portions 40.

Further, the through hole 45 has the thin portion 45a which is thin on the back surface side of the door portion 40, and the opening area of the through hole 45 decreases from the inner side to the outer side of the door portion 40 due to the thin portion 45a.

In this configuration, since the opening area of the through hole 45 increases on the back surface side of the door portion 40, the operability is enhanced when the projection portions 62 are inserted. The thin portion 45a may have a shape in which the through hole 45 decreases in a tapered shape from the inner side to the outer side of the door portion 40.

In addition, on the side surface of the projection portion 62, the parting line 60L is formed near the surface side opposite to the surface of the flap 60 facing the airbag 4a.

In this configuration, during deployment of the airbag 4a, the airbag 4a is prevented from coming into direct contact with the parting line 60L.

The guide portion 50 has higher rigidity than the flap 60.

In this configuration, when the airbag 4a is inflated, the guide portion 50 having higher rigidity is present in the deployment passage 8, so that the pressure generated due to the inflation of the airbag 4a is easily concentrated on the cleavage line 6.

Embodiments of the present invention were described above, but the above embodiments are merely examples of applications of this invention, and the technical scope of this invention is not limited to the specific constitutions of the above embodiments.

The present application claims priority to Japanese Patent Application No. 2022-036645 filed on Mar. 9, 2022 to Japan Patent Office, the entire content of which is incorporated herein by reference.

The invention claimed is:

1. An airbag attachment structure for attaching an airbag to an instrument panel, comprising:
    a door portion whose at least one end portion is welded to a back surface of the instrument panel along a cleavage line of the instrument panel, and the door portion being opened when the airbag is deployed;
    an attachment portion to which an airbag case for storing the airbag is attached, and which has an opening at which the door portion is opened and brought into an opened state when the airbag is deployed;
    a hinge portion connected to the attachment portion and configured to turnably hold the door portion; and
    a flap interposed between the airbag and the hinge portion and configured to turn together with the door portion when being biased by the airbag during deployment of the airbag, wherein
    the door portion is provided with a through hole penetrating from an inner side to an outer side of the door portion at an inclination of an acute angle from a hinge portion side to a one end portion side of the door portion,
    the flap has, at a tip portion thereof, a projection portion inserted into the through hole, and
    in the flap, in a state where the projection portion is inserted into the through hole, a gap is formed between the back surface of the instrument panel and the projection portion, and a gap is formed between a position, which is the tip portion of the flap and at which the projection portion is not formed, and the inner side of the door portion.

2. The airbag attachment structure according to claim 1, wherein the projection portion is removed from the through hole when the airbag is deployed and the cleavage line is cleaved by the door portion.

3. The airbag attachment structure according to claim 1- or 2, wherein at least one of the projection portion and the through hole is provided with a rib that is in contact with the other of the projection portion and the through hole in a thickness direction of the projection portion.

4. The airbag attachment structure according to claim 3, wherein the rib is formed at the projection portion, and
    the rib includes a first rib that is in contact with an inner side of the through hole, and a second rib that is provided at an end portion in a width direction of the through hole with respect to the first rib and that is in contact with the through hole.

5. The airbag attachment structure according to claim 1, wherein the flap swings around a connection point during deployment of the airbag, and
    the flap is linearly formed from the connection point to a tip of the projection portion.

6. The airbag attachment structure according to claim 1, wherein the through hole has a thin portion at which a thickness of the door portion is thin, and an opening area of the through hole decreases from the inner side to the outer side of the door portion due to the thin portion.

7. The airbag attachment structure according to claim 1, wherein on a side surface of the projection portion, a parting line is formed near a surface side opposite to a surface of the flap facing the airbag.

8. The airbag attachment structure according to claim 1, further comprising:
    a guide portion protruding from the attachment portion to narrow a deployment passage between the airbag and the door portion, the guide portion being configured to guide deployment of the airbag, wherein
    the flap is connected to the guide portion, and
    the guide portion has higher rigidity than the flap.

* * * * *